(12) United States Patent
Lee et al.

(10) Patent No.: US 9,940,155 B1
(45) Date of Patent: Apr. 10, 2018

(54) PROTOCOL ENDPOINT OBJECT DUALITY (71) Applicant: EMC Corporation, Hopkinton, MA (US)

(72) Inventors: Shuyu Lee, Acton, MA (US); Jean Schiff, Bolton, MA (US); Dilesh Naik, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/986,066

(22) Filed: Dec. 31, 2015

(51) Int. Cl.
*G06F 9/455* (2006.01)
*G06F 3/06* (2006.01)

(52) U.S. Cl.
CPC ........ *G06F 9/45558* (2013.01); *G06F 3/0608* (2013.01); *G06F 3/0664* (2013.01); *G06F 3/0683* (2013.01); *G06F 2009/45583* (2013.01)

(58) Field of Classification Search
None
See application file for complete search history.

(56) References Cited

U.S. PATENT DOCUMENTS

2013/0054890 A1* 2/2013 Desai .................... G06F 3/0604 711/114

\* cited by examiner

*Primary Examiner* — Sisley Kim
(74) *Attorney, Agent, or Firm* — BainwoodHuang (57) ABSTRACT

Embodiments are directed to implementing the protocol endpoint (PE) as a LUN object without significant modification to also support additional features. In particular, since many of the additional features are similar to those already implemented within storage group objects, it would be desirable to implement a PE using both a LUN object and a storage group object linked together. This result may be accomplished by implementing the PE as a LUN object is used when certain features are being accessed and as a storage group object that is used when other features are being accessed. This linkage may be achieved by indexing both the storage group object and the LUN object representing the PE using the same World Wide Name.

12 Claims, 6 Drawing Sheets

PROTOCOL ENDPOINT OBJECT DUALITY

RELATED APPLICATIONS

This application may be considered to be related to co-pending application Ser. No. 14/985,960 entitled "LUN WITH ZERO STORAGE AS A PROTOCOL ENDPOINT" filed on even date herewith, the entire content and teaching of which is incorporated herein by this reference.

BACKGROUND

Virtual machines (VMs) are used to allow several logical computers to run on a single computing device. VMs conveniently may also be created on-the-fly as needed. Typically, a VM makes use of several different disk volumes, including, for example, a configuration volume, a data volume, a swap volume, etc. In some systems (e.g., VMware), each VM has at least four volumes, and each volume may have up to 32 snapshots (presenting a view of the data on that volume at a particular moment in time). Thus, each VM may be associated with 128 or more volumes. If a system runs 1,000 VMs, for example, there may be on the order of 128,000 volumes, which is more than a typical data storage system is capable of presenting at once, even if the system is internally capable of managing that many logical drives.

A virtual logical volume (e.g., a VMWare VVol) is a logical volume that is managed by a data storage system but presented to an external host via a protocol endpoint (PE). A PE functions as a single SCSI target but presents many internal logical volumes to an external host.

SUMMARY

There are complications in actually implementing a PE on a data storage system. A PE shares some features with a traditional volume (e.g., a LUN). However, since a traditional volume does not present VVols to a host, it is not possible to simply represent a PE using a LUN object. Instead it would be possible to implement a PE as an entirely new object rather than as a LUN limited by the features of a traditional volume. However, doing so would require writing a lot of new code to implement a new data structure. In particular, many features implemented in drivers within the storage driver stack, such as redirection between parallel storage processors, would have to be re-implemented in the context of a new data structure.

Thus, it would be desirable to utilize features already implemented within the storage driver stack by implementing a PE as a LUN object without significant modification to also support additional features. In particular, since many of the additional features are similar to those already implemented within storage group objects, it would be desirable to implement a PE using both a LUN object and a storage group object linked together. This result may be accomplished by implementing the PE as a LUN object that is used when certain features are being accessed and as a storage group object that is used when other features are being accessed. This linkage may be achieved by indexing both the storage group object and the LUN object representing the PE using the same World Wide Name.

In one embodiment, a computer-implemented method performed by a computing device. The method includes (a) receiving a setup command directing the computing device to create a protocol endpoint on the computing device, (b) in response to receiving the setup command, (1) creating a first logical storage device object representing the protocol endpoint and (2) creating a first storage group object also representing the protocol endpoint, (c) subsequently, receiving a management command directing the computing device to associate the protocol endpoint with a remote host to allow the remote host to access storage volumes of the computing device presented to the remote host through the protocol endpoint as virtual storage volumes, (d) in response to receiving the management command, placing the first logical storage device object within a second storage group object, the second storage group object containing storage volumes of the computing device presented to the remote host, (e) receiving a command directing the protocol endpoint to present a new virtual storage volume to the remote host, and (f) in response to receiving the command, (1) creating a second logical storage device object representing a storage volume of the computing device and (2) placing the second logical storage device object within the first storage group object, the second logical storage device object thereby being presented by the protocol endpoint to the remote host as the new virtual storage volume. An apparatus and computer program product for performing a similar method are also provided.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views.

DETAILED DESCRIPTION

Embodiments are directed to implementing the PE as a LUN object without significant modification to also support additional features. In particular, since many of the additional features are similar to those already implemented within storage group objects, it would be desirable to implement a PE using both a LUN object and a storage group object linked together. This result may be accomplished by implementing the PE as a LUN object that is used when certain features are being accessed and as a storage group object that is used when other features are being accessed. This linkage may be achieved by indexing both the storage group object and the LUN object representing the PE using the same World Wide Name.

Figure 1:
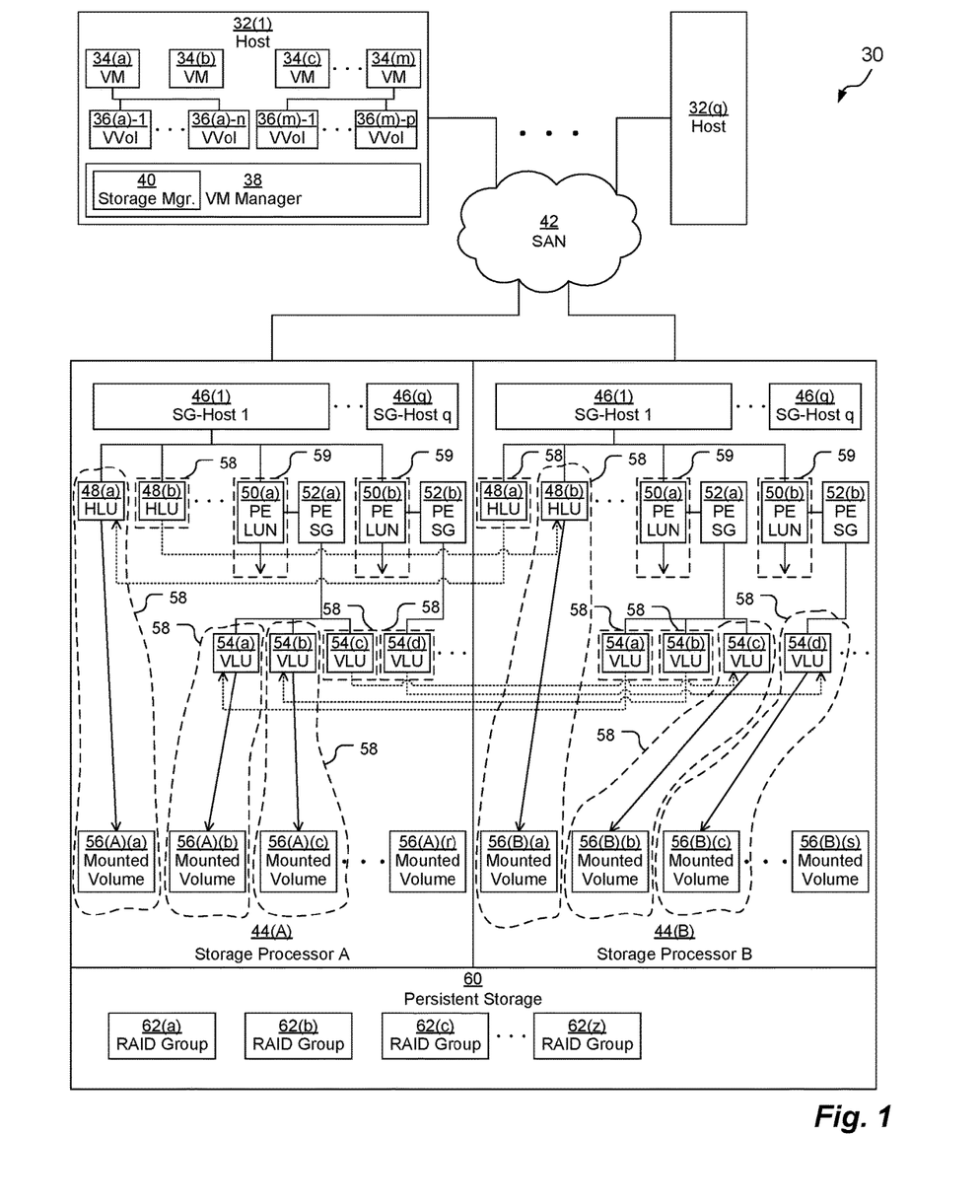
FIG. 1 is a block diagram depicting an example system and apparatus for use in connection with various embodiments.

FIG. 1 depicts a data storage system 30 connected to one or more hosts 32 (depicted as hosts 32(a), ..., 32(q)) over a network, such as storage area network (SAN) 42. Data storage system 30 is a computing device, made up of persistent storage 60 and two storage processors (SPs) 44 (depicted as SPs 44(A), 44(B)), although this is by way of example only; other types of computing devices are also possible. For example, although two SPs 44(A), 44(B) are depicted, in some embodiments, there may be only a single SP 44 or there may be more than two.

A host 32 may be any kind of computing device configured to operate on a network, such as, for example, personal computers, workstations, server computers, enterprise servers, laptop computers, tablet computers, smart phones, mobile computers, etc. or combinations thereof. Typically, a host 32 is a server computer or an enterprise server. Host 32(a) represents an example typical host 32. Host 32(a) runs a virtual machine (VM) management application 38, which manages a plurality of VMs 34 (depicted as VMs 34(a), 34(b), 34(c), . . . , 34(m)) executing on one or more processors (not depicted) of the host 32(a). VM management application 38 may include a hypervisor, as is well-known in the art. Each VM 34 may be associated with one or more virtual storage volumes such as VVols 36. As depicted, VM 34(a) is able to access VVols 36(a)-1, . . . , 36(a)-n, while VM 34(m) is able to access VVols 36(m)-1, . . . , 36(m)-p. These VVols 36 are not actually present on host 32(a), being logical abstractions of storage volumes presented by data storage system 30, made to appear to the VMs 34 like actual disks by storage manager 40 of the VM management application 38.

Persistent storage 60 may include one or more of any kind of storage device (not depicted) able to persistently store data, such as, for example, a magnetic hard disk drive, a solid state storage device (SSD), etc. As depicted, persistent storage 60 is arranged as a plurality of RAID groups 62 (depicted as RAID groups 62(a), 62(b), 62(c), . . . , 62(z)).

Each RAID group 62 is made up of one or more storage devices, which may logically combine to create a logical disk having larger size or redundancy features or both, depending on the RAID level, as is well-known in the art. Each RAID group 62 may be partitioned into one or more volumes. In some embodiments (not depicted), instead of being partitioned directly into volumes, each RAID group 62 may be partitioned into a plurality of slices (e.g., 256 megabytes or 1 gigabyte in size). Slices from one or more RAID groups 62 may be logically combined to create volumes.

SP 44(A) represents an example typical SP 44. SP 44(A) has one or more host storage groups (SGs) 46 (depicted as host SGs 46(1), . . . , 46(q)). A host SG 46 organizes a set of host-visible logical units (HLUs) 48 (depicted as HLUs 48(a), 48(b), . . . ) and protocol endpoint logical units (PE LUNs) 50 (typically two, such as PE LUNs 50(a) and 50(b) as depicted) which are visible to a particular host 32. Typically, a given host 32 has only one associated host SG 46 per SP 44. Thus, for example, as depicted, host SG 46(1) organizes HLUs 48(a), 48(b) and PE LUNs 50(a), 50(b), which are visible to host 32(1). Host SG 46(q) organizes HLUs 48 and PE LUNs 50 that are visible to host 32(q), although the particular HLUs 48 and PE LUNs 50 organized by host SG 46(q) are not depicted.

An HLU 48 is a logical volume or disk that is made visible to an external host 32. Each HLU 48 has underlying storage via a mounted volume 56 (depicted as mounted volumes 56(A)(a), 56(A)(b), 56(A)(c), . . . , 56(A)(r) on SP 44(A) and mounted volumes 56(B)(a), 56(B)(b), 56(B)(c), . . . , 56(B)(s) on SP 44(B), with arrows pointing from each HLU 48 to the mounted volume 56 that underlies it), each of which has its underlying storage drawn from a RAID group 62 of persistent storage 60, allowing data to be stored there. An HLU 48 is typically visible to any kind of host 32 on the SAN 42 regardless of whether that host 32 is running a VM management application 38 (and storage manager 40), although placement in a host SG 46 will limit which particular hosts 32 may access that HLU 48. An HLU 48, therefore, is typically used for non-VM storage as well as for storage for VMs 34. Thus, as depicted, HLU 48(a) is a data object visible to host 32(1) that represents mounted volume 56(A)(a). The relationship between HLU 48(a) and mounted volume 56(A)(a) is defined by a storage driver stack 58, which contains those data objects, allowing them to be operated on by various drivers. Storage driver stack 58 and its associated drivers are described in further detail below, in connection with FIG. 2.

HLU 48(b) is a data object visible to host 32(1) that represents mounted volume 56(B)(a), which is mounted on SP 44(B). Since the mounted volume 56(B)(a) underlying HLU 48(b) is not mounted on SP 44(A), if host 32(1) attempts to access HLU 48(b) through SP 44(A), SP 44(A) redirects or otherwise routes the access through SP 44(B). Thus, within its storage driver stack 58 is a mechanism for redirecting commands directed at HLU 48(b) on SP 44(A) to the corresponding HLU 48(b) on SP 44(B) (depicted by the dotted arrowed line between these objects). This is a result of the Active-Passive configuration of data storage system 30. Thus, any given mounted volume 56 is only mounted on one SP 44, but a host 32 may be able to access that mounted volume 56 via an exposed HLU 48 on either SP, either via the preferred path through the SP 44 on which the mounted volume 56 is mounted or via a non-preferred path going through two SPs 44. Although the dotted arrowed line is only depicted as pointing from HLU 48(b) on SP 44(A) to HLU 48(b) on SP 44(B), in fact, there may also be some redirection in the other direction. Thus, for example, if a configuration change is made to HLU 48(b) on SP 44(B), that change is mirrored to the HLU 48(b) on SP 44(A).

A PE LUN 50 is also a logical volume that is made visible to an external host 32 running a VM management application 38 as a SCSI target. However, unlike a traditional logical volume (e.g., an HLU 48), a PE LUN 50 has zero underlying storage on persistent storage 60. This lack of underlying storage is depicted by the arrow to nowhere protruding from each PE LUN 50, since there is no mounted volume 56 providing underlying storage for a PE LUN 50. PE LUNs 50 are each managed by a respective storage driver stack 59, which operates on those data objects. Storage driver stack 59 is described in further detail below, in connection with FIG. 2.

A PE LUN 50 is a data object visible to a host 32 that presents virtual logical units (VLUs) 54 (depicted as VLUs 54(a), 54(b), 54(c), 54(d), . . . ) to the host 32 as VVols 36. VLUs 54 are not exactly "virtual," except insofar as they are typically used by virtual machines 34. PE LUN 50(a) on SP 44(A) is a data object visible to host 32(1) that represents a preferred path to VLUs 54(a), 54(b), 54(c) via SP 44(A). PE LUN 50(a) on SP 44(B) is a corresponding data object visible to host 32(1) that represents a non-preferred path to VLUs 54(a), 54(b), 54(c) via SP 44(B). Because the preferred path for PE LUN 50(a) is on SP 44(A), VLUs 54(a) and 54(b) are data objects with underlying storage provided by mounted volumes 56(A)(b) and 56(A)(c), respectively, both mounted on SP 44(A). As depicted, VLU 54(c) no longer has its underlying mounted volume 56(B)(b) mounted on SP 44(A), although this is an unusual configuration, albeit possible.

PE LUN 50(b) on SP 44(A) is a data object visible to host 32(1) that represents a non-preferred path to VLU 54(d). PE LUN 50(b) on SP 44(B) is a corresponding data object visible to host 32(1) that represents the preferred path to VLU 54(d) via SP 44(B). Because the preferred path for PE LUN 50(b) is on SP 44(B), VLU 54(d) is a data object with underlying storage provided by mounted volume 56(B)(c) mounted on SP 44(B). Typically, there are two PE LUNs 50(a), 50(b) on each SP 44 for a given host SG 46—one representing a preferred path for that SP 44 and one representing a non-preferred path for that SP 44.

The relationship between a VLU 54 and a respective mounted volume 56 is defined by a storage driver stack 58, which contains those data objects, allowing them to be operated on by various drivers.

In some embodiments, in order to organize the VLUs 54 presented by a particular PE, a PE SG 52 is used in conjunction with the PE LUN 50. A given PE LUN 50 has only one associated PE SG 52. Thus, as depicted, PE LUN 50(a) has corresponding PE SG 52(a). PE SG 52(a) organizes the set of VLUs 54(a), 54(b), 54(c) which are visible to a host 32(1) via a first PE. Similarly, as depicted, PE LUN 50(b) has corresponding PE SG 52(b). PE SG 52(b) organizes the set of VLUs including 54(d) which are visible to a host 32(1) via a second PE.

Figure 2:
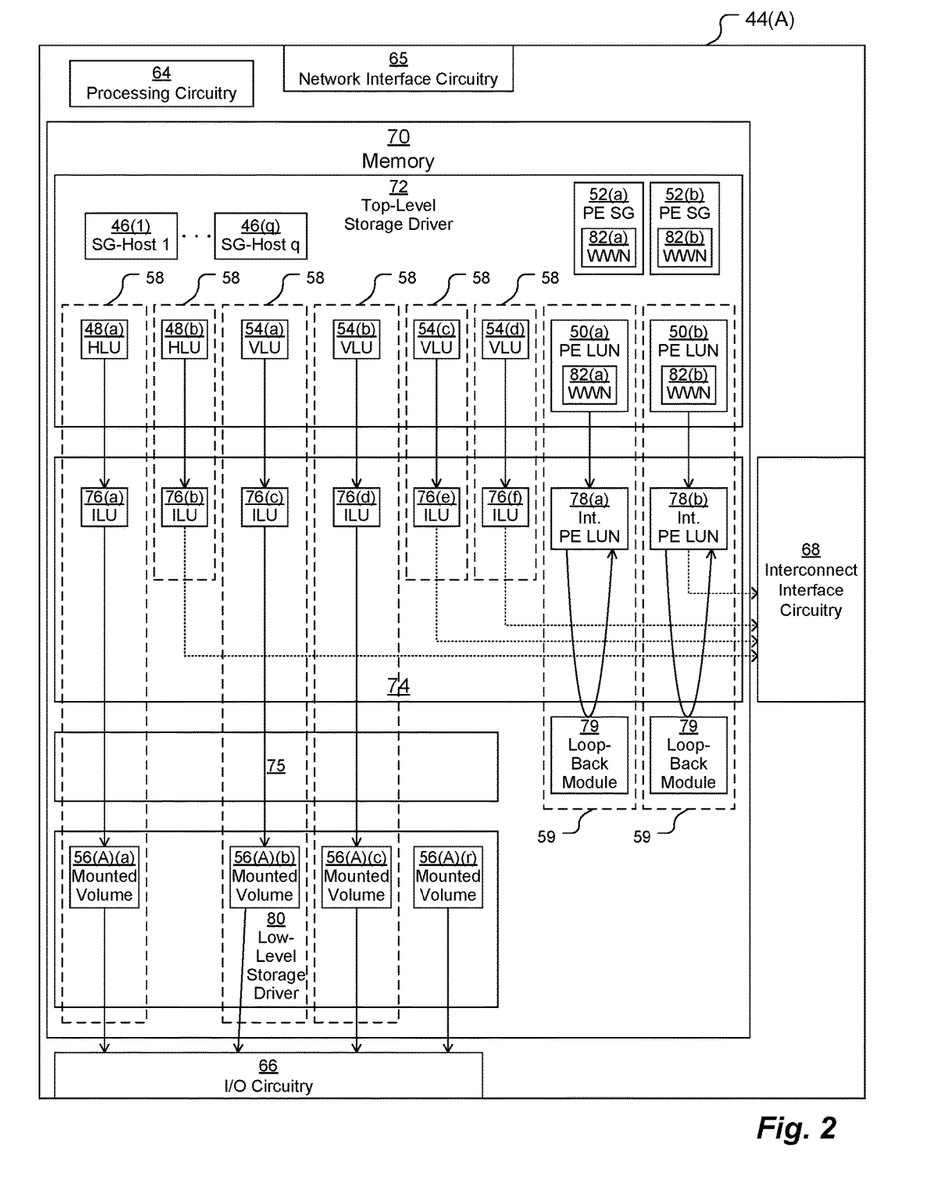
FIG. 2 is a block diagram depicting an example apparatus for use in connection with various embodiments.

FIG. 2 depicts a different view of an example SP 44(A), with more attention paid to the hardware. Storage processor 44(A) includes processing circuitry 64, network interface circuitry 65, input/output (I/O) circuitry 66, SP interconnect interface circuitry 68, and memory 70. In a typical arrangement, storage processor 44(A) is configured as a board or enclosure mounted within a rack connected to persistent storage 60 also mounted within the rack. These components, in combination, may make up data storage system 30.

Processing circuitry 64 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Network interface circuitry 65 may include one or more Ethernet cards, cellular modems, Fibre Channel (FC) adapters, Wireless Fidelity (Wi-Fi) wireless networking adapters, and other devices for connecting to a network, such as a SAN 42, local area network (LAN), wide area network (WAN), cellular data network, etc. Network interface circuitry 65 is able to communicate with hosts 32. In operation, VMs 34 running on host 32(1) send data storage commands to storage processor 44(A) in order to read from and write to persistent storage 60. VMs 34 may directly access HLUs 48 within the host SG 46(1) for that host 32(1). For a VM 34(a) to access one of its associated VVols 36(a)-1, it sends a storage command to storage manager 40 of the VM management application 38, which picks an appropriate path (preferably an optimized path, which, in this case, is through SP 44(A)) and forwards the storage command to the SP 44(A).

I/O circuitry 66 is configured to connect to a storage interconnect bus (e.g., via a backplane) to enable communication with disks of persistent storage 60. The storage interconnect bus may include one or more of a Fiber Channel, SCSI, Serial Attached SCSI, ATA, Serial ATA, or other similar storage buses for communicating with storage.

SP interconnect interface circuitry 68 is configured to connect to a high-speed inter-processor bus (not depicted), which allows the SPs 44 to communicate with each other directly.

Memory 70 may be any kind of digital system memory, such as, for example, random access memory (RAM). Memory 70 stores one or more operating systems in operation (not depicted, e.g., Linux, UNIX, Windows, MacOS, or a similar operating system), various applications executing on processing circuitry 64 as well as data used by those applications.

As depicted, memory 70 includes several storage drivers including a top-level storage driver (TLD) 72, a redirector driver 74, and a low-level storage driver 80. In some embodiments, one or more of these drivers 72, 74, 80 may have its functionality distributed across several other drivers in addition to those depicted.

TLD 72 is responsible for presenting volumes outside the data storage system 30. Thus, TLD 72 maintains objects representing volumes that are accessible by hosts 32, including HLUs 48, VLUs 54, and PE LUNs 50. In addition, TLD 72 maintains storage groups including host SGs 46 and PE SGs 52.

In some embodiments, when a host 32(x) attempts to access a volume on SP 44(A), it addresses a command to a target address. The target address is several bytes in length. In some embodiments, the first t bits (e.g., 16 bits or two bytes) of the target address are used to index into a particular HLU 48 or PE LUN 50 within the host SG 46(x) for that host 32(x). In some of these embodiments, several bits within the two-byte portion are reserved. For example, there may be 14 bits available for indexing, allowing up to $2^{14}$ or 16,384 HLUs 48 and PE LUNs 50 within a host SG 46. Typically, no more than two PE LUNs 50 are allowed, representing an optimized and a non-optimized path (although, in some embodiments, there could conceivably be more PE LUNs 50).

If a PE LUN 50 is addressed, TLD 72 is tasked with ascertaining whether the host 32 is attempting to access the PE itself or a VLU 54 presented by the PE. In some embodiments, a u-bit next portion of the target address (e.g., u is 8 bits, so the third byte) may encode a signal indicating whether the PE itself is being addressed or whether a VLU 54 is being addressed. In one embodiment, if the third byte of the target address is zero, the PE itself is being addressed, while if the third byte of the target address has a specific non-zero code (e.g., 11100010), a VLU 54 is being addressed. Any other value for the third byte would be invalid, indicating an error. If the TLD 72 determines that a VLU 54 is being addressed, TLD 72 proceeds to read the remainder of the target address. In one embodiment, the target address is 8 bytes in length, leaving the remaining 5 bytes or 40 bits for indexing particular VLUs 54, although this is by way of example only. In some embodiments, target address may have a different length, leaving a different number of bits available for indexing VLUs 54. 40 bits allows a theoretical maximum of about 1 trillion VLUs 54 to be indexed per PE, although a typical system will have far fewer than that.

Once TLD 72 determines the index of a particular VLU 54 being addressed by the target address, TLD 72 may make reference to the PE SG 52(x) for the given PE in order to find the particular VLU 54 object in memory. In one embodiment, this is easily accomplished by indexing PE LUNs 50 and PE SGs 52 using common indices. Thus, the PE LUN 50(a) is indexed by a first unique World Wide Name (WWN) 82(a), and its corresponding PE SG 52(a) is also indexed by the same first unique WWN 82(a). Similarly, the PE LUN 50(b) is indexed by a second unique WWN 82(b), and its corresponding PE SG 52(b) is also indexed by the same second unique WWN 82(b).

Although TLD 72 manages HLUs 48, VLUs 54, and PE LUNs 50, each HLU 48 and VLU 54 is managed by a respective standard storage driver stack 58, while each PE LUN 52 is managed by a respective shortened storage driver stack 59. A standard storage driver stack 58 has TLD 72 at the top with redirector driver 74 in the middle of the stack 58 and low-level storage driver 80 at the bottom of the stack 58. In some embodiments, a standard storage driver stack 58 also contains one or more additional drivers 75 in between the redirector driver 74 and the low-level storage driver 80. In some embodiments (not depicted), there may also be additional drivers in a standard storage driver stack 58 below the low-level storage driver 80.

However, a shortened driver stack 59 has TLD 72 at the top with redirector driver 74 below it, but omitting the low-level storage driver 80. Instead, within shortened driver stack 59 there is a loop-back module 79 that replaces the low-level storage driver 80 and possibly the additional drivers 75, but always returning a successful response. For example, if a SCSI command requesting the size of the LUN is sent to a PE LUN 50, the command will propagate down the stack to the loop-back module 79, which will return a size of zero.

Redirector driver 74 is responsible for maintaining the active-passive configuration of the data storage system 30. Redirector driver 74 manages intermediate logical units 76, which are data objects that may represent either HLUs 48 or VLUs 54, however, at this level of the driver stack 58, that distinction is not relevant. Some ILUs 76 (e.g., ILUs 76(a), 76(c), and 76(d), as depicted) point to mounted volumes 56 mounted on the SP 44(A) (e.g., mounted volumes 56(A)(a), 56(A)(b), and 56(A)(c), respectively), while other ILUs 76 (e.g., ILUs 76(b), 76(e), and 76(f), as depicted) are redirected to the other SP 44 (B) via interconnect interface circuitry 68. In addition, although not depicted, redirector driver 74 also is responsible for providing redirection services in the opposite direction, receiving redirection to ILUs 76(a), 76(c), and 76(d) from corresponding redirector driver 74 on SP 44(B). Redirector driver 74 forwards any commands (aside from commands involving redirection management) directed at ILUs 76 to either the next level of the driver stack 58 or to the peer SP 44(B) based on the redirection for that particular ILU 76.

Redirector driver 74 also manages intermediate PE LUNs 78, which are data objects that represent PE LUNs 50 but at the redirection level. An intermediate PE LUN 78 (e.g., intermediate PE LUN 78(b)) may redirect to a corresponding intermediate PE LUN 78(b) on peer SP 44(B) via interconnect interface circuitry 68. In addition, although not depicted, redirector driver 74 also is responsible for providing redirection services in the opposite direction, receiving redirection to intermediate PE LUN 78(a) from corresponding redirector driver 74 on SP 44(B). Thus far, the management of intermediate PE LUNs 78 by redirector driver 74 is the same as for ILUs 76. However, instead of forwarding any received commands (aside from commands involving redirection management) directed at intermediate PE LUNs 78 to the next level of the driver stack 58, redirector driver 74 forwards commands directed to PE LUNs 78 that are not redirected (e.g., for PE LUN 78(a)) to loop-back module 79 of the shortened driver stack 59. In addition, the redirection at this level allows configuration information regarding the PE to be shared between the SPs 44.

Finally, low-level storage driver 80 is responsible for managing mounted volumes 56 that are mounted on the SP 44(A), mapping these mounted volumes 56 to specific RAID groups 62 (and partitions of slices thereof) on persistent storage 60. Low-level storage driver 80 may communicate directly with I/O circuitry 66 to send I/O commands to persistent storage 60.

In some embodiments, memory 70 may also include a persistent storage portion (not depicted). Persistent storage portion of memory 70 may be made up of one or more persistent storage devices, such as, for example, hard disk drives, solid-state storage devices, flash drives, etc. Persistent storage of memory 70 is configured to store programs and data even while the storage processor 44(A) is powered off. The OS (e.g., Linux, UNIX, Windows, or a similar operating system) and the applications (e.g., drivers 72, 74, 80) are typically stored in persistent storage (either persistent storage of memory 70 or persistent storage 60) so that they may be loaded into memory 70 from persistent storage upon a system restart. These applications, when stored in non-transient form either in the volatile portion of memory 70 or in persistent storage, form a computer program product. The processing circuitry 64 running one or more of these applications thus forms a specialized circuit constructed and arranged to carry out the various processes described herein.

Figure 3:
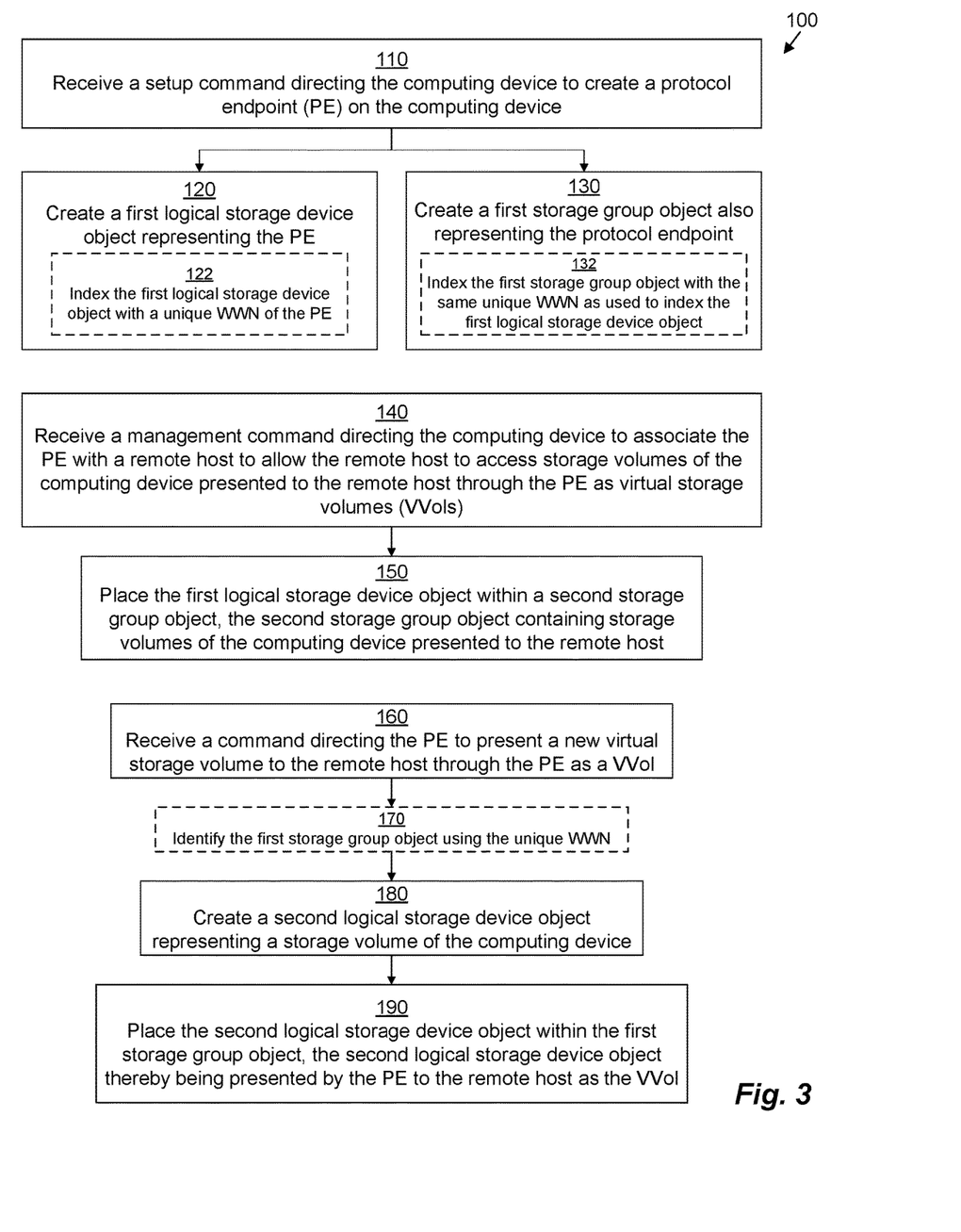
FIG. 3 is a flowchart depicting an example method for use in conjunction with various embodiments.

FIG. 3 illustrates an example method 100 performed by data storage system 30. It should be understood that any time a piece of software (e.g., driver 72, 74, 80, etc.) is described as performing a method, process, step, or function, in actuality what is meant is that a computing device (e.g., data storage system 30 or its component storage processor 44; host 32, etc.) on which that piece of software is running performs the method, process, step, or function when executing that piece of software on its processing circuitry 64.

It should be understood that, within FIG. 3, various sub-steps are dashed because they may be optional and not fundamental to method 100. However, it should be understood that, in some embodiments, one or more of the other steps or sub-steps may also be omitted. Similarly, in some embodiments, one or more steps or sub-steps may be combined together or performed in a different order.

Method 100 is performed by data storage system 30, typically by only one or the other of storage processors 44(A), 44(B). For ease of description, method 100 will be described in the context of performance on SP 44(A) in communication with a particular host 32(1). Method 100 may typically be performed by both SPs 44 separately. In addition, method 100 may be logically divided into three segments. Steps 110-130 involve setting up a PE on an SP 44 and are typically performed only once per PE per SP 44. Steps 140-150 involve associating a PE with a particular remote host 32. Steps 160-190 involve processing a Bind command for adding a VVol to a PE once that PE has been set up. These steps 160-190 may be performed many times once the PE has been set up.

In step 110, SP 44(A) receives a setup command directing the SP 44(A) to create a PE on the system 30.

In response, in step 120, SP 44(A) creates a first logical storage device object (PE LUN 50) representing the PE.

In some embodiments, step 120 includes indexing the PE LUN 50 with a unique WWN of the PE (sub-step 122).

In some embodiments, the logical storage device object has zero underlying storage capacity. This may be done by placing the PE LUN 50 within shortened driver stack 59 rather than standard storage driver stack 58.

In step 130, which may be performed in parallel with step 120 in response to step 110, SP 44(A) creates a first storage group object (PE SG 52) also representing the PE.

In some embodiments, step 130 includes indexing the PE SG 52 with the same unique WWN of the PE as used to index the PE LUN 50 (sub-step 132).

In step 140, SP 44(A) receives a management command directing the SP 44(A) to associate the PE with a remote host 32(1) to allow the remote host 32(1) to access storage volumes (e.g., VLUs 54 representing respective underlying mounted volumes 56) of the SP 44(A) presented to the remote host 32(1) through the PE as Vvols 36.

Subsequently, in step 150, SP 44(A) places the PE LUN 50 within a second storage group object (host SG 46(1)), the host SG 46(1) containing storage volumes of the data storage system 30 presented to the remote host 32(1) (i.e., HLUs 48 and PE LUNs 50 presented to remote host 32(1)). It should be noted that when a storage group (e.g., a host SG 46 or a PE SG 52) is described as "containing" storage volumes, this refers to logical placement of the storage volumes within the storage group as a container; this may involve a storage volume object being pointed to from within a storage group object.

Step 160 typically takes place after step 150, although in some embodiments, step 160 may take place prior to steps 140-150 but after steps 120 and 130. In step 160, SP 44(A) receives a command directing the PE to present a new virtual storage volume (i.e., VLU 54) to the remote host 32(1) as a VVol 36. In some embodiments, the command of step 160 is received in-band (i.e., it is a SCSI command directed at the PE LUN 50), while, in other embodiments, the command of step 160 is received out-of-band, addressed generally to the SP 44(A) and typically not a SCSI command.

In response, in step 180, SP 44(A) creates a second logical storage device object (i.e., VLU 54) representing a storage volume of the computing device (i.e., a mounted volume 56).

In some embodiments, prior to step 180, in step 170, SP 44(A) identifies the PE SG 52 using its unique WWN. In the in-band case, the unique WWN is already known because the command of step 160 addressed to the PE LUN 50, which knows its own WWN, which is the same as the WWN of the PE SG 52. In the out-of-band case, TLD 72 is able to look up the WWN.

In step 190, SP 44(A) places the newly-created VLU 54 within the PE SG 52, the VLU 54 thereby being presented by the PE to the remote host 32(1) as the new VVol 36.

Figure 4:
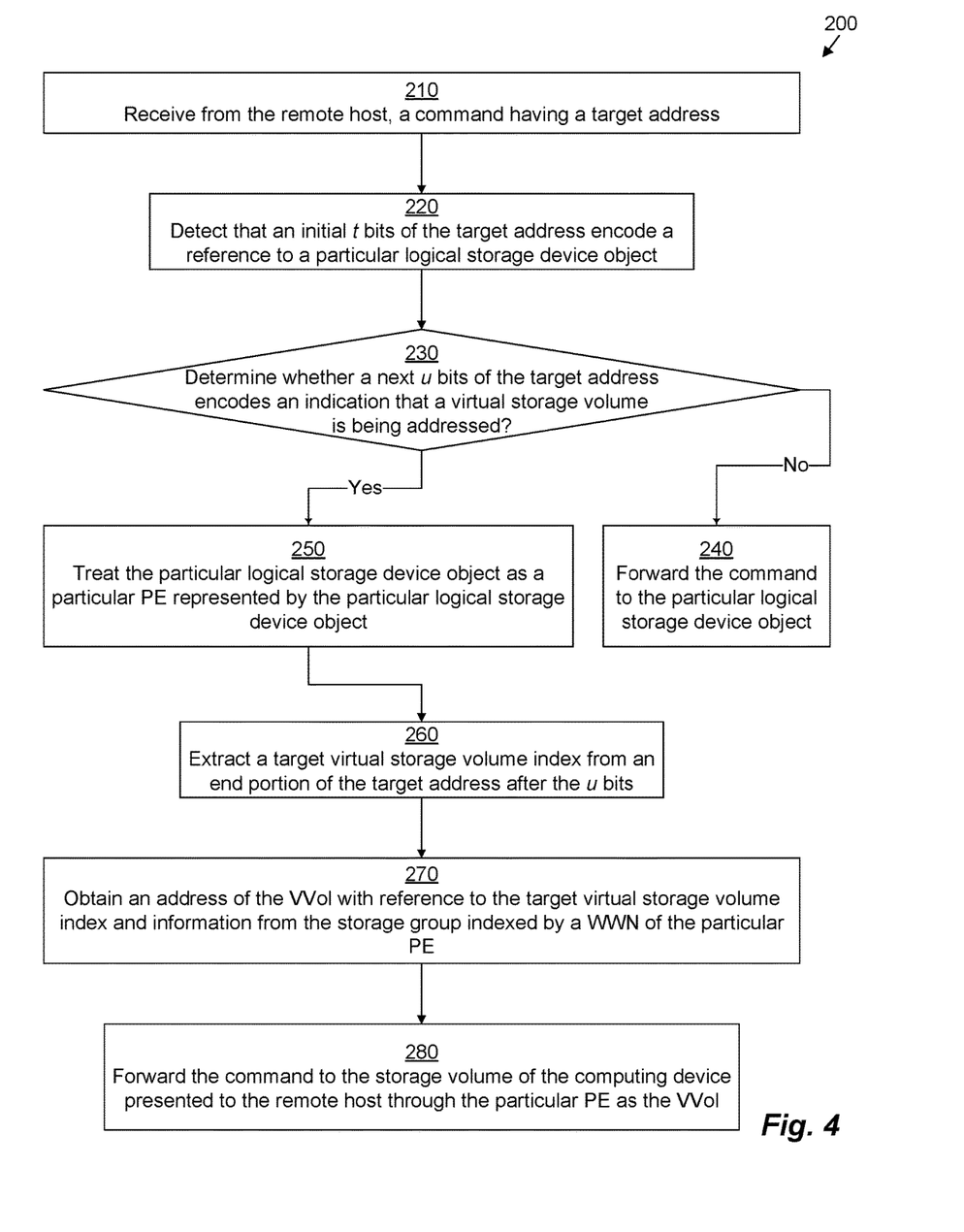
FIG. 4 is a flowchart depicting an example method for use in conjunction with various embodiments.

FIG. 4 depicts a method 200, performed by an SP 44 (e.g., SP 44(A)) for routing a command to particular HLU 48, VLU 54, or PE based on a target address. Method 200 typically occurs after method 100.

It should be understood that, within FIG. 4, various steps and sub-steps are dashed because they may be optional and not fundamental to method 200. However, it should be understood that, in some embodiments, one or more of the other steps or sub-steps may also be omitted. Similarly, in some embodiments, one or more steps or sub-steps may be combined together or performed in a different order.

Method 200 is performed by data storage system 30, typically by only one or the other of storage processors 44(A), 44(B). For ease of description, method 200 will be described in the context of performance on SP 44(A) in communication with a particular host 32(1).

In step 210, SP 44(A) receives, from the remote host 32(1), a command having a target address. The command is a storage-related command, such as a SCSI I/O or management command.

In step 220, SP 44(A) detects that an initial t bits (e.g., an initial 16 bits or two bytes) of the target address encode a reference to a particular logical storage device object (e.g., an HLU 48 or a PE LUN 50).

In step 230, SP 44(A) determines whether or not a next u bits (e.g., the next 8 bits, which is the third byte) of the target address encodes an indication that a VLU 54 is being addressed. For example, in one embodiment, SP 44(A) determines that a VLU 54 is being addressed if the third byte contains a specific non-zero code (e.g., 11100010) and determines that a VLU 54 is not being addressed if the third byte is empty (i.e., 00000000).

If the SP 44(A) determines, in step 230, that a VLU 54 is not being addressed, then operation proceeds with step 240. In step 240, SP 44(A) forwards the command to the particular logical storage device object (e.g., an HLU 48 or a PE LUN 50) that was addressed by the first two bytes of the target address (see above at step 220) to be processed by TLD 72.

If the SP 44(A) determines, in step 230, that a VLU 54 is being addressed, then operation proceeds with step 250. In step 250, SP 44(A) treats the identified particular logical storage device object as a particular PE represented by a PE LUN 50. In step 260, SP 44(A) extracts a target virtual storage volume index from an end portion of the target address. For example, in one embodiment, if the target address is 8 bytes in length, SP 44(A) extracts the target virtual storage volume index from the last 5 bytes of the target address.

Then, in step 270, SP 44(A) obtains an address of the VLU 54 with reference to the target virtual storage volume index and information from the PE SG 52. In one embodiment, SP 44(A) makes a call to a storage group (i.e., a PE SG 52) indexed by a WWN of the particular PE, requesting the address of the referenced VLU 54 from the PE SG 52 given the index. In other embodiments, a SP 44(A) may instead consult a hash table (or another indexing structure) that was built using data extracted from the PE SG 52.

In step 280, SP 44(A) forwards the command to the VLU 54 to be processed by TLD 72.

Figure 5:
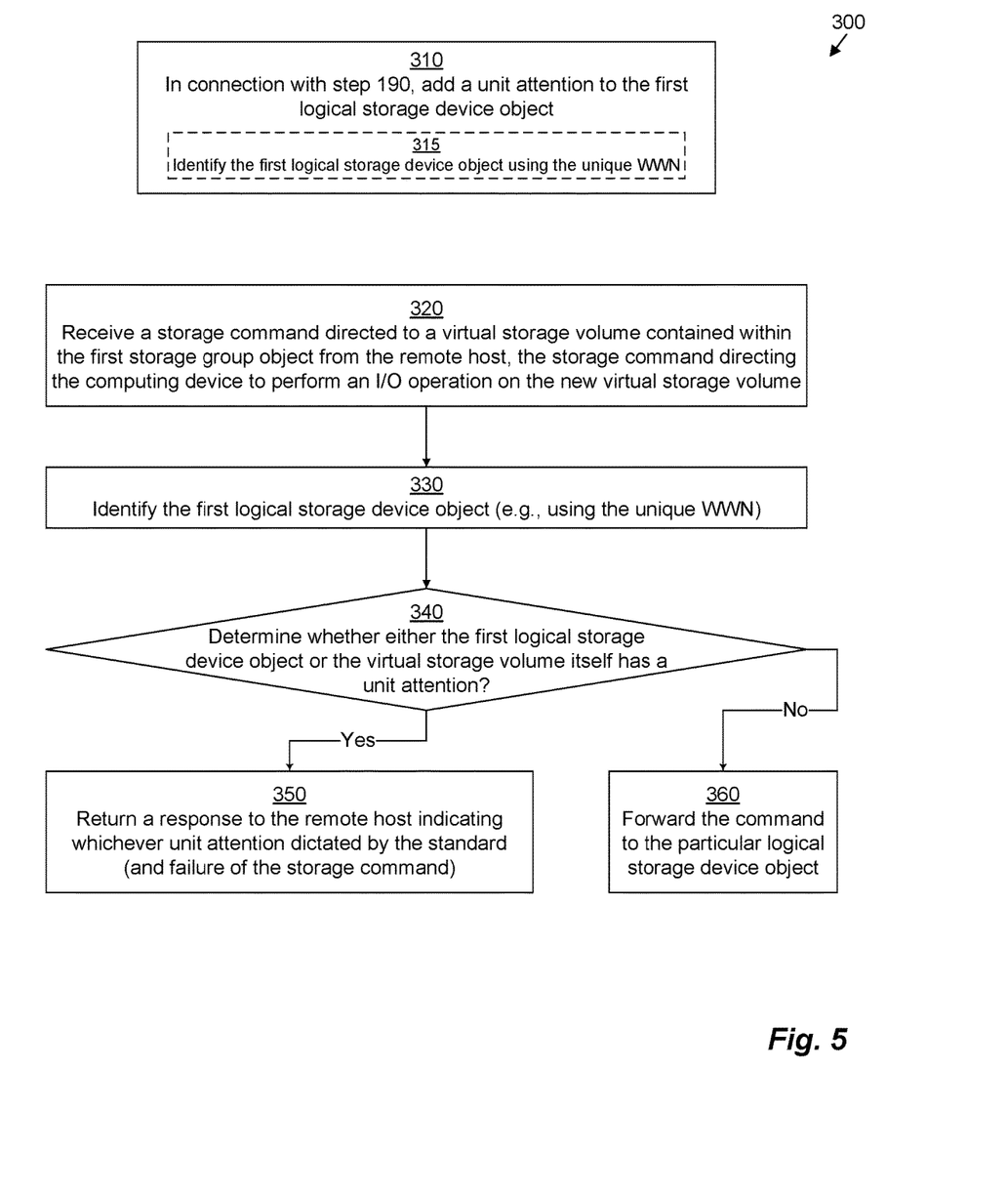
FIG. 5 is a flowchart depicting an example method for use in conjunction with various embodiments.

FIG. 5 depicts a method 300, performed by an SP 44 (e.g., SP 44(A)) for setting up a Unit Attention (UA) on a Bind command to add an additional VVol 36 to a PE as a VLU 54. Method 300 occurs after method 100 has been performed with initial step 310 taking place in connection with the last step (step 190) of method 100.

It should be understood that, within FIG. 5, various steps and sub-steps are dashed because they may be optional and not fundamental to method 300. However, it should be understood that, in some embodiments, one or more of the other steps or sub-steps may also be omitted. Similarly, in some embodiments, one or more steps or sub-steps may be combined together or performed in a different order.

Method 300 is performed by data storage system 30, typically by only one or the other of storage processors 44(A), 44(B). For ease of description, method 300 will be described in the context of performance on SP 44(A) in communication with a particular host 32(1). Method 300 may be logically divided into two segments. Step 310 involves setting up a UA on a PE on an SP 44 when a new VVol 36 is added to the PE. Steps 320-360 involve processing a storage command after the UA has been added.

In step 310, which is performed in connection with step 190 from FIG. 3, SP 44(A) adds a unit attention to the PE LUN 50 upon the VLU 54 being added to the PE SG 52. In some embodiments, the PE LUN 50 is identified by obtaining the WWN from the PE SG 52 to which the VLU 54 was just added and using that WWN to index into the PE LUNs 50.

At some point later, in step 320, SP 44(A) receives a storage command directed to a VLU 54(x) from the remote host, the storage command directing the computing device to perform an I/O operation (e.g., a READ or WRITE operation) on VLU 54(x).

In response, in step 330, SP 44(A) identifies the PE LUN 50 which presents that VLU 54(x) to a remote host 32. The VLU 54(x) is a member of PE SG 52, so PE SG 52 may be easily found. Since PE SG 52 has the same WWN as its associated PE LUN 50, the PE LUN 50 may then be easily found.

In step 340, SP 44(A) determines whether or not either the VLU 54(x) or the identified PE LUN 50 has a UA set. Thus, for example, the PE LUN 50 would have a UA set (indicating that a new LUN has been added) because it was set it step 310. It is also possible that the VLU 54(x) itself might have a UA set, for example, if that VLU 54(x) had recently been reset.

If SP 44(A) determines that there is a UA, then operation proceeds with step 350. In step 350, in accordance with the SCSI standard, the storage command will fail due to the presence of the UA, and SP 44(A) returns a failure response to the remote host 32(1) with a UA indication (i.e., T10 sense key 6h). At this point, that UA is removed. In the event that there are two conflicting UAs, both UAs should eventually be reported, but since only one can be reported at once, SP 44(A) chooses one of the UAs to report first in accordance with standard precedence rules for UAs, keeping the other UA intact for later reporting.

If SP 44(A) determines that there is no UA, then operation proceeds with step 360. In step 360, TLD 72 sends the storage command down the driver stack 58 for that VLU 54(x) (e.g., to redirector driver 74 to ultimately be fulfilled by low-level storage driver 80 on the appropriate SP 44).

Figure 6:
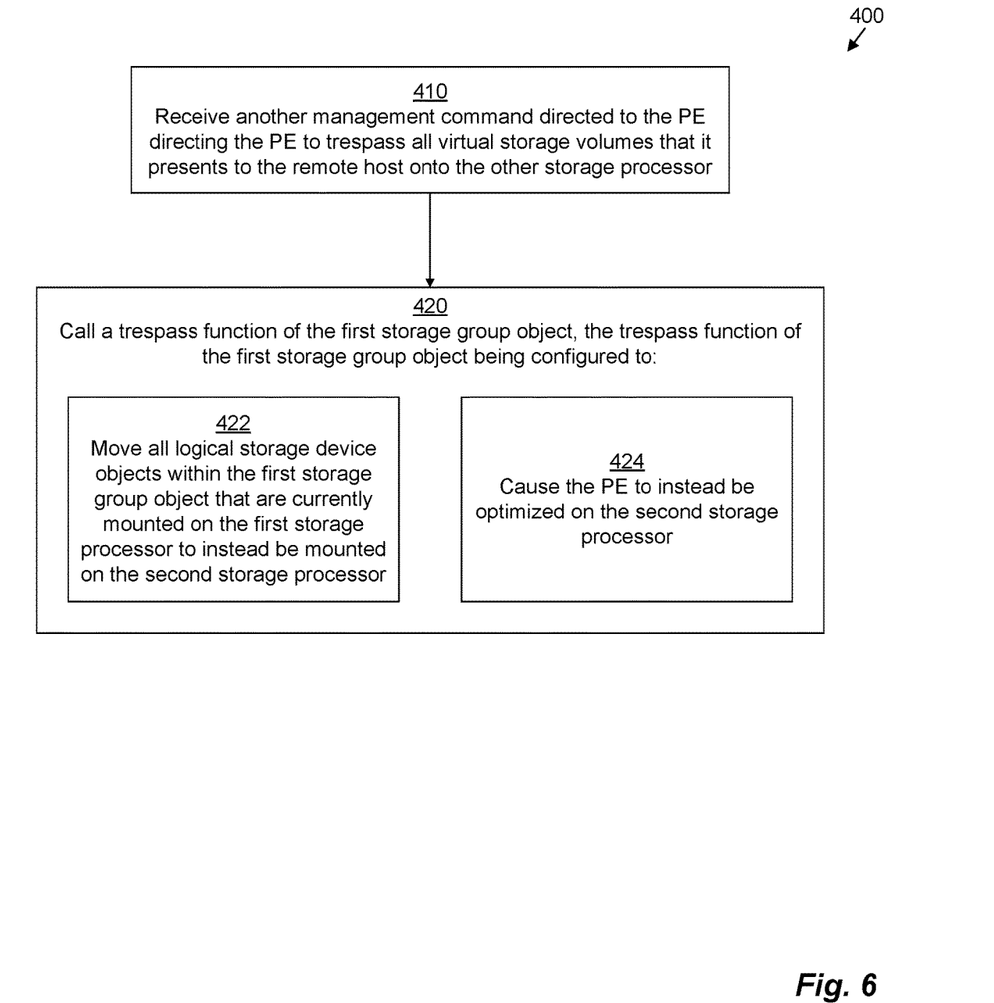
FIG. 6 is a flowchart depicting an example method for use in conjunction with various embodiments.

FIG. 6 depicts a method 400, performed by an SP 44 (e.g., SP 44(A)) for responding to a trespass command to trespass a PE to the peer SP 44(B). Thus, method 400 occurs after method 100 has been performed (since the PE already exists).

It should be understood that, within FIG. 6, various steps and sub-steps may be omitted, combined together, or performed in a different order. Method 400 is performed by data storage system 30, typically by only one or the other of storage processors 44(A), 44(B). For ease of description, method 400 will be described in the context of performance on SP 44(A) in communication with a particular host 32(1) with respect to the PE of PE LUN 50(a).

In step 410, SP 44(A) receives another management command directed to the PE directing the PE to trespass to the other peer SP 44(B).

In response, in step 420, SP 44(A) calls a trespass function of PE SG 52(a). The trespass function of PE SG 52(a) is configured to perform sub-steps 422 and 424.

In sub-step 422, the trespass function of PE SG 52(a) is configured to trespass all VLUs 54(a)-(c) that are members of PE SG 52(a) that are currently mounted on SP(A) to instead become mounted on peer SP 44(B). Thus, in the example configuration of FIG. 1, in sub-step 422, the trespass function of PE SG 52(a) would cause VLUs 54(a), 54(b) to become mounted on SP 44(B) rather than SP 44(A). However, since VLU 54(c) is already mounted on SP 44(B), no trespass needs to be performed on VLU 54(c).

In sub-step 424, the trespass function of PE SG 52(a) is configured to cause the PE to instead be based on peer SP 44(B). Normally this will involve flipping flags on SPs 44(A) and 44(B) to indicate that the optimized path for the PE is now on SP 44(B) and the non-optimized path is on SP 44(A).

Thus, techniques for implementing the PE as a LUN object (PE LUN 50) without significant modification to also support additional features have been provided. In particular, since many of the additional features are similar to those already implemented within storage group objects, it would be desirable to implement a PE using both a LUN object and a storage group object linked together. This result may be accomplished by implementing the PE as a LUN object (PE LUN 50) that is used when certain features are being accessed and as a storage group object (PE SG 52) that is used when other features are being accessed. This linkage may be achieved by indexing both the storage group object (PE SG 52) and the LUN object (PE LUN 50) representing the PE using the same WWN.

While various embodiments of the present disclosure have been particularly shown and described, it will be understood by those skilled in the art that various changes in form and details may be made therein without departing from the spirit and scope of the present disclosure as defined by the appended claims.

For example, it should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

It should be understood that all embodiments that have been described may be combined in all possible combinations with each other, except to the extent that such combinations have been explicitly excluded.

Finally, even if a technique, method, apparatus, or other concept is specifically labeled as "conventional," Applicant makes no admission that such technique, method, apparatus, or other concept is actually prior art under 35 U.S.C. §102 or 35 U.S.C. §103, such determination being a legal determination that depends upon many factors, not all of which are known to Applicant at this time.

What is claimed is:

1. A computer-implemented method performed by a computing device, the method comprising:
   receiving a setup command directing the computing device to create a protocol endpoint on the computing device;
   in response to receiving the setup command:
      creating a first logical storage device object as a first representation of the protocol endpoint; and
      creating a first storage group object as a second representation of the protocol endpoint;
   subsequently, receiving a management command directing the computing device to associate the protocol endpoint with a remote host to allow the remote host to access storage volumes of the computing device presented to the remote host through the protocol endpoint as virtual storage volumes;
   in response to receiving the management command, placing the first logical storage device object within a second storage group object, the second storage group object containing storage volumes of the computing device presented to the remote host;
   receiving a command directing the protocol endpoint to present a new virtual storage volume to the remote host; and in response to receiving the command:
    creating a second logical storage device object representing a storage volume of the computing device; and
    placing the second logical storage device object within the first storage group object, the second logical storage device object thereby being presented by the protocol endpoint to the remote host as the new virtual storage volume;
wherein a logical storage device object is a structure that is configured to represent a storage volume (LUN), the logical storage device object being further configured to process SCSI commands with respect to the represented storage volume; and
wherein a storage group object is a structure that is configured to contain a plurality of logical storage device objects, the storage group object being further configured to perform organizational tasks on the plurality of logical storage device objects.

2. The method of claim 1 wherein:
creating the first logical storage device object as the first representation of the protocol endpoint includes indexing the first logical storage device object with a unique World Wide Name (WWN) of the protocol endpoint; and
creating the first storage group object as the second representation of the protocol endpoint includes indexing the first storage group object with the same unique WWN as used to index the first logical storage device object.

3. The method of claim 2 wherein the method further comprises, in response to receiving the command, identifying the first storage group object using the unique WWN.

4. The method of claim 2 wherein the method further includes, in response to placing the second logical storage device object within the first storage group object:
    identifying the first logical storage device object using the unique WWN from the first storage group object;
    adding a unit attention to the first logical storage device object.

5. The method of claim 1 wherein the method further includes, in response to placing the second logical storage device object within the first storage group object, adding a unit attention to the first logical storage device object.

6. The method of claim 1 wherein:
the protocol endpoint is optimized on a first storage processor of the computing device, the computing device also having a distinct second storage processor, the first logical storage device object and the first storage group object both being stored in memory of the first storage processor;
the method further includes:
    receiving another management command directed to the protocol endpoint directing the protocol endpoint to trespass all virtual storage volumes that it presents to the remote host onto the other storage processor; and
    in response to receiving the other management command, calling a trespass function of the first storage group object, the trespass function of the first storage group object being configured to:
        move all logical storage device objects within the first storage group object that are currently mounted on the first storage processor to instead be mounted on the second storage processor; and
        cause the protocol endpoint to instead be optimized on the second storage processor.

7. An apparatus comprising:
network interface circuitry for communicating with a remote host over a network connection;
I/O circuitry for communicating with persistent storage; and
processing circuitry coupled to memory configured to perform the following operations:
    receiving a setup command directing the apparatus to create a protocol endpoint;
    in response to receiving the setup command:
        creating a first logical storage device object in memory as a first representation of the protocol endpoint; and
        creating a first storage group object in memory as a second representation of the protocol endpoint;
    subsequently, receiving a management command directing the apparatus to associate the protocol endpoint with the remote host to allow the remote host to access storage volumes backed by the persistent storage presented to the remote host through the protocol endpoint as virtual storage volumes via the network interface circuitry;
    in response to receiving the management command, placing the first logical storage device object within a second storage group object in memory, the second storage group object containing storage volumes backed by the persistent storage presented to the remote host;
    receiving a command directing the protocol endpoint to present a new virtual storage volume to the remote host; and
    in response to receiving the command:
        creating a second logical storage device object in memory representing a storage volume of the apparatus; and
        placing the second logical storage device object within the first storage group object, the second logical storage device object thereby being presented by the protocol endpoint to the remote host as the new virtual storage volume;
    wherein a logical storage device object is a structure that is configured to represent a storage volume (LUN), the logical storage device object being further configured to process SCSI commands with respect to the represented storage volume; and
    wherein a storage group object is a structure that is configured to contain a plurality of logical storage device objects, the storage group object being further configured to perform organizational tasks on the plurality of logical storage device objects.

8. A computer program product comprising a non-transitory computer-readable storage medium storing a set of instructions, which, when executed by the computing device, cause the computing device to perform the following operations:
receiving a setup command directing the computing device to create a protocol endpoint on the computing device;
in response to receiving the setup command:
    creating a first logical storage device object as a first representation of the protocol endpoint; and
    creating a first storage group object as a second representation of the protocol endpoint;
subsequently, receiving a management command directing the computing device to associate the protocol endpoint with a remote host to allow the remote host to access storage volumes of the computing device presented to the remote host through the protocol endpoint as virtual storage volumes;

in response to receiving the management command, placing the first logical storage device object within a second storage group object, the second storage group object containing storage volumes of the computing device presented to the remote host;

receiving a command directing the protocol endpoint to present a new virtual storage volume to the remote host; and in response to receiving the command:
- creating a second logical storage device object representing a storage volume of the computing device; and
- placing the second logical storage device object within the first storage group object, the second logical storage device object thereby being presented by the protocol endpoint to the remote host as the new virtual storage volume;

wherein a logical storage device object is a structure that is configured to represent a storage volume (LUN), the logical storage device object being further configured to process SCSI commands with respect to the represented storage volume; and wherein a storage group object is a structure that is configured to contain a plurality of logical storage device objects, the storage group object being further configured to perform organizational tasks on the plurality of logical storage device objects.

9. The computer program product of claim 8 wherein:

creating the first logical storage device object as the first representation of the protocol endpoint includes indexing the first logical storage device object with a unique World Wide Name (WWN) of the protocol endpoint; and creating the first storage group object as the second representation of the protocol endpoint includes indexing the first storage group object with the same unique WWN as used to index the first logical storage device object.

10. The computer program product of claim 8 wherein the set of instructions, when executed by the computing device, further cause the computing device to perform the following operation:

in response to placing the second logical storage device object within the first storage group object, adding a unit attention to the first logical storage device object.

11. The apparatus of claim 7 wherein:

creating the first logical storage device object as the first representation of the protocol endpoint includes indexing the first logical storage device object with a unique World Wide Name (WWN) of the protocol endpoint; and creating the first storage group object as the second representation of the protocol endpoint includes indexing the first storage group object with the same unique WWN as used to index the first logical storage device object.

12. The apparatus of claim 7 wherein the processing circuitry coupled to memory is further configured to perform the following operation:

in response to placing the second logical storage device object within the first storage group object, adding a unit attention to the first logical storage device object.

* * * * *